United States Patent [19]
Miller
[11] 3,715,513
[45] Feb. 6, 1973

[54] PABX-INTERFACE INTERCONNECTION DEVICE

[75] Inventor: Louis A. Miller, Utica, N.Y. Utica, N.Y. 13501
[73] Assignee: DND Electronics, Utica, N.Y.

[22] Filed: Oct. 29, 1970
[21] Appl. No.: 85,036
[52] U.S. Cl. .......... 179/18 AD, 179/16 E
[51] Int. Cl. .......... H04m 7/06
[58] Field of Search ... 179/18 AD, 18 AH, 16 EC, 179/16 A, 16 E, 27 CA, 16 F

[56] References Cited

UNITED STATES PATENTS

| | | | |
|---|---|---|---|
| 2,813,930 | 11/1957 | Berch | 179/27 CB |
| 3,156,775 | 11/1964 | Ioakimidis et al. | 179/16 EC |
| 3,221,108 | 11/1965 | Seemann et al. | 179/27 CA |
| 3,342,944 | 9/1967 | Barbato et al. | 179/18 AD |
| 2,915,590 | 12/1959 | Bergmann | 179/16 EC |

*Primary Examiner*—Thomas W. Brown
*Attorney*—Dennison, Dennison, Townshend & Meserole

[57] ABSTRACT

An interconnection device for telephonic circuits automatically restores to a two-wire configuration telephonic signals applied to a multiple wire telephone interface circuit. Supervision, polarity, and/or alert signals distributed by an interface in the form of multiple circuit closures are reproduced in the form of two-wire signals made available to customer-owned equipment. The interconnect device permits duplex services between the premises of the customer user and outside locations reached through the central office. A plug-in printed card construction of the interconnect offers extremely convenient access to customer-owned equipment and provides numerous interconnect options with efficient mounting thereof.

8 Claims, 8 Drawing Figures

INVENTOR
LOUIS A. MILLER

BY Dennison, Dennison, Townshend & Meserole

ATTORNEYS

Dennison, Dennison, Townshend & Meserole ATTORNEYS

Dennison, Dennison, Townshend & Meserole
ATTORNEYS

Dennison, Dennison, Townsend & Meserole
ATTORNEYS

PABX-INTERFACE INTERCONNECTION DEVICE

BACKGROUND OF THE INVENTION

1. Field of the Invention

The present invention relates to telephonic communication systems and, particularly, to a field of art described generally as the interconnection of customer-owned terminal equipment to telephone-company provided facilities.

2. Description of the Prior Art

In instances where a customer of telephone services requires a relatively large number of extensions, the usual practice is to install on the premises or in some otherwise convenient location a private automatic branch exchange, commonly referred to as a PABX. Generally, a request for service made by placing a call either incoming or outgoing of the PABX involves completion of a d.c. circuit over a conventional two-wire circuit which, when completed, places the user of the telephone set at the PABX and the party in voice communication. Prior art telephone company equipment therefore is generally designed to establish a conventional two-wire circuit from the customer-owned equipment to a corresponding two-wire connection by which the central office can be reached. By virtue of revised protective tariffs being granted to telephone companies, a policy has been initiated which grants to the telephone companies the right to install an interface device between the customer-owned equipment and the facilities leading to the central office side of the line. The effect of these regulations is expected to lead to the adoption of numerous types of interfaces whose form will in large measure be affected by the type of service and trunk line facilities required by the PABX. While the interface circuit will continue to provide via dry circuit closures all of the signals deemed necessary for the proper control of the telephone lines, thus assuring the integrity of and compliance with telephone company specifications, the two-wire circuit characterizing the prior art promises to require an interface connection having from perhaps four to as many as 10 or more circuits, depending upon the complexity of the service requirements of the individual PABX user. It thus becomes apparent that the prior art reliance on methods for providing duplex two-wire PABX trunk connections may no longer be adequate as far as interfaces are concerned. Each of the service functions required by the PABX such as, for example, seizure, ringing, answer supervision, transmission path to the PABX trunk must now be dealt with on an individual basis in order to comply with the tariff provisions regarding the interface. It therefore becomes more apparent that the trunk circuits of customer-owned PABX equipment will periodically be required to undergo extensive modification with each change in the character of service desired. Such a modification process may be expected to introduce costly and time consuming complications in the absence of an interconnect configuration designed to lessen the problems of reproducing PABX signalling functions, with less dependence on the form of the telephone company-provided interface. It is proposed that the interconnect device of the present invention achieves these ends.

SUMMARY

The interconnection device of the present invention comprises an easily removable and replaceable printed circuit connector which operates as an adapter to connect varying forms of PABX equipment to an interface circuit having a direct connection to the central office lines. Available in various modes matching the signalling requirements of privately owned PABX equipment, the interconnection device offers at considerable convenience and limited cost selective connections between a two-wire PABX trunk and the standard two-wire circuit to which the interface is joined. In reproducing the signalling functions in a manner which satisfies the entrance requirements for customers who wish to connect privately owned equipment to telephone company facilities, the interconnection device simplifies or omits entirely both the expensive and time consuming problems generally attendant to expanded interconnection through protective interfaces.

Accordingly, an object of the invention is to provide an interconnection device which simplifies the interconnection of PABX's with telephone lines where interface units are required by tariff regulations.

Another object of the invention is to provide an interconnection device which automatically connects a customer-owned PABX trunk to an interface.

A further object of the invention is to provide an interconnection device which handles calls originating from opposite directions.

Another feature of the interconnection device of the invention is to supply talking battery on either a loop-start or on a ground-start basis.

Still another feature characterizing the interconnection device of the invention is to fulfull service request in the form of a d.c. circuit closure applied to the interface, and to reverse the polarity on the tip and ring lines at the PABX trunk in response to a reversal at the central office.

Yet another object of the invention is to provide an interconnection device which transmits a ringing signal to the PABX in response to a signal alert indication transmitted through the interface circuit.

Another object of this invention is the provision of an interconnection device which converts an answer condition in the PABX to a d.c. circuit closure transmitted to the interface.

Still another object of the invention is to provide an interconnection device which, on ground starts, interrupts the ground connection of the tip conductor at the PABX when the central office goes "on hook."

Yet another object of the invention is to provide a printed circuit card interconnection device particularly adaptable to meet different customer-circuit requirements.

BRIEF DESCRIPTION OF THE DRAWINGS

In the drawings, similar reference characters refer to similar elements in each of the several illustrated embodiments.

DESCRIPTION OF THE PREFERRED EMBODIMENTS

Figure 1:
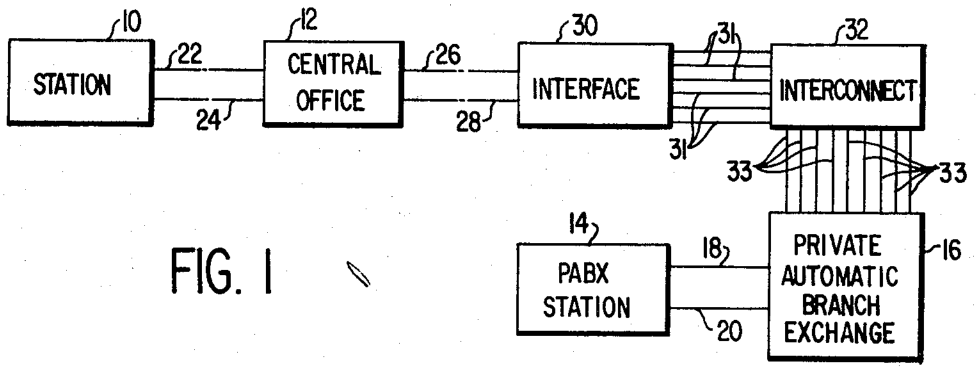
FIG. 1 shows in schematic form the manner in which the interconnection device of the invention may be associated with the interface and private automatic branch exchange portions of a telephone message system.

Referring now to FIG. 1, there is shown in principle a station 10, associated with a central office 12, from which it is assumed, either by rotary dialling or by tone generation, a number is dialed which is assigned to the extension or station 14 of a private automatic branch exchange 16 (PABX) of conventional type. The PABX 16 is connected to a two-wire circuit represented by lines 18 and 20 leading to PABX station 14. Similarly arranged lines 22 and 24 are provided for completing a connection between station 10 and central office 12, and a similar line circuit shown by the lines 26 and 28 extends from central office 12 over which a call, either to or from extension 14, is directed. The arrangement contemplates the requirement of an interface circuit 30 shown herein connected to central office 12 by lines 26 and 28 and one suitable interface which adequately may fulfull the functions of the interface 30 shown in FIG. 1 is the CDH interface available from the Bell Telephone System. Interface circuits such as that illustrated are well known in the art. The line circuit equipment of the interface circuit 30, though not shown or represented herein in detail, is employed in the usual manner to permit the connection of many different kinds of inputs with various features to the various lines and trunks which terminate at the central office which serves them. To this end, interface circuit 30 is connected by a plurality of lines designated herein broadly by the reference numeral 31 to an interconnect device 32 embodying the invention, subsequently to be described in detail, which in turn is connected, by a plurality of lines referenced herein broadly by the numeral 33, to PABX 16, whereby a connection established by central office 12 is continued via interface 30 and interconnect 32 over lines 31 and 33 to PABX 16.

It should be pointed out that the AC and DC potentials applied by central office 12 to the lines 26 and 28 are reproduced on two of the lines which extend to PABX 16. In actual practice, several of the remaining lines will be used for power leads from the PABX while appointed ones of the other lines 33 may be made available for optional use by the user. Accordingly, of the lines herein referenced 33, they may be more specifically divided into the categories of two reproduced telephone lines, three for power, and three for auxiliary purposes. Whatever arrangement decided upon, it will be clear that reproduced AC and DC signals which are impressed on lines 26 and 28 will appear on two of the lines 33 extending to PABX 16.

PRINTED CIRCUIT INTERCONNECT

Figure 2:
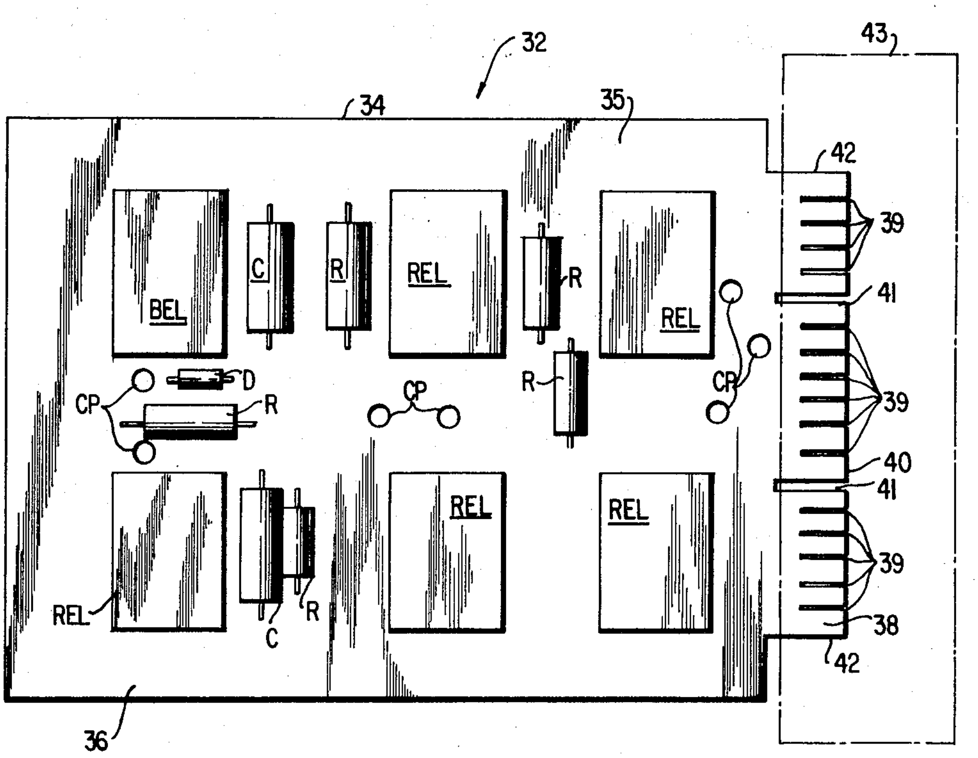
FIG. 2 is a top plan view of the printed circuit card interconnection device of the invention showing various components assembled thereon.

Referring to FIG. 2, the interconnection device 32 is shown constructed of a printed conductor panel 34 having a top surface 35 which carries a plurality of components which are electrically connected in a circuit pattern carried by surface 35. The pattern of printed wires may be made by any suitable method and, for clarity in presenting the description, its exact arrangement has not been shown in FIG. 2, but the pattern will be described diagrammatically in detail hereinbelow in connection with the description of the preferred embodiments.

The panel 34 comprises a sheet of insulating material which has a main body portion 36 and a terminal portion 38 which is of preferably less width than the body 36 and projects outwardly from one end of the body. The conductors (not shown) carried by body 36 are electrically connected in a well-known manner with terminal conductors 39 disposed on the rear surface of terminal portion. Conductors 39 are arranged to extend in parallel spaced relation from the front edge 40 of portion 38 and they terminate at points spaced a short distance from edge 40. The terminal portion 38 may have slots 41 off-centered with respect to the side edges 42 of terminal portion 38 for polarizing the terminal conductors with the contacts of a standard line cell 43 as will be understood by those skilled in the art. The line cell 43, though not further described, is preferably of sufficient size to carry a corresponding number of sockets by which the electrical leads extending from the interface 30 and PABX 16 may be electrically connected in firm fixed assembly therewith. In the preferred embodiment, the printed pattern arrangement (not shown) formed on top surface 35 may be affixed to conductors 39 over the lower surface of panel 34.

The components shown mounted on panel 34 are of a form known in the art and, in the preferred assembly, they include d.c. electromagnetic relays REL, capacitors C, resistors R, and a single diode D. The panel 34 further includes a number of connector straps or contact points CP intended for optional electrical connection either with each other or with other portions of the printed circuit pattern on panel 34, as will be described.

The relays REL illustrated in FIG. 2 are assumed to have a specific combination of springs in the contact assembly which may be required for each relay. The contact-spring assembly as understood by those skilled in the art includes the armature spring, so named because they respond directly to the thrust imparted by each movement of the armature. Each armature spring has an associated back contact spring with which it is normally in engagement in its normal or released position and, in addition, it may have a front-contact spring which is engaged by the armature spring when moved a sufficient distance from its back-contact spring.

OUTGOING CALL FROM PABX

Figures 3, 4:
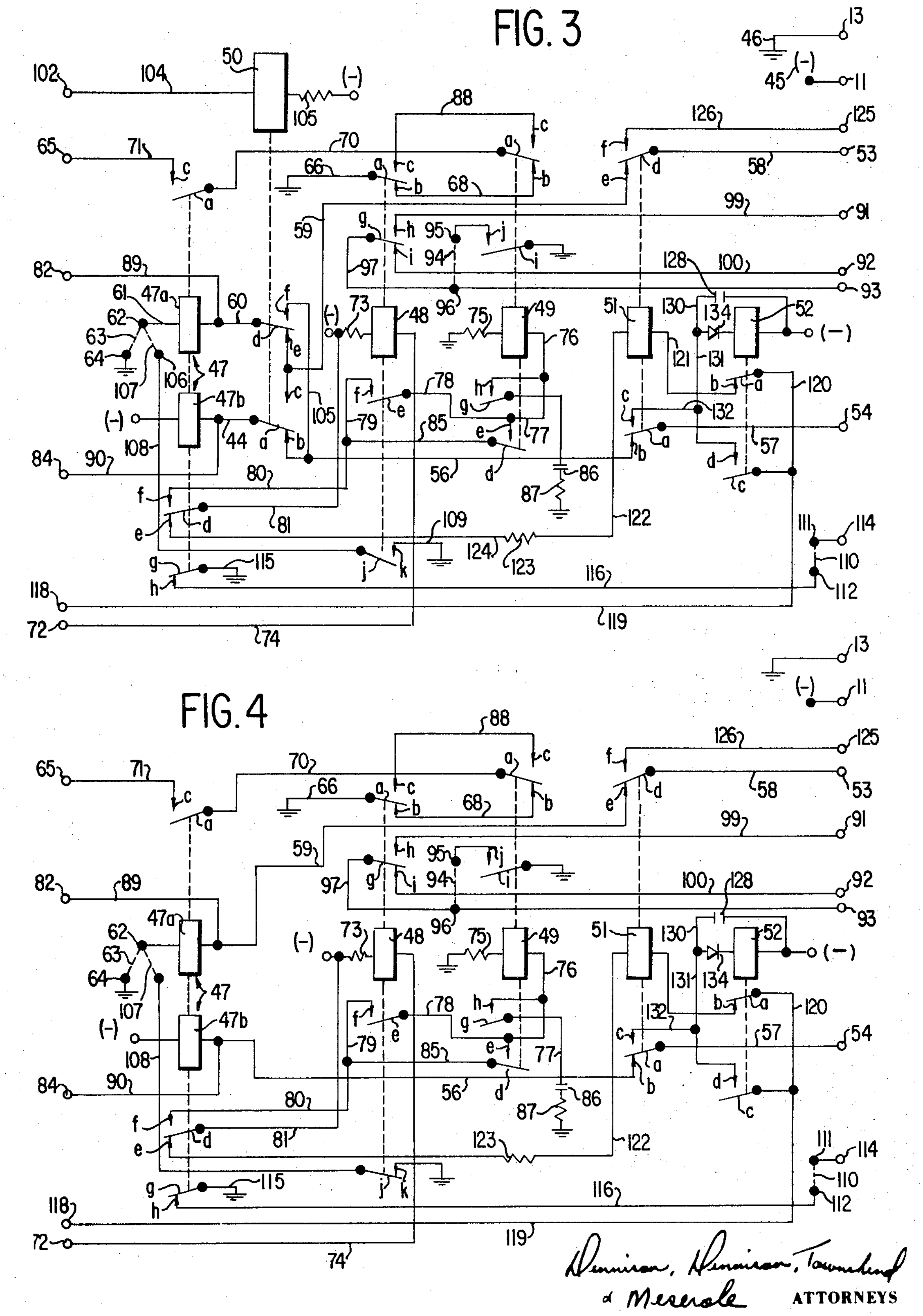
FIG. 3 is a schematic circuit of the interconnection device contemplated by the invention in one specific illustrative embodiment thereof.
FIGS. 4, 5, 6, 7 and 8 are schematic circuits describing variations of the specific illustrative embodiment of the invention shown in FIG. 1.

The detailed description of the interconnection device embodying the invention now follows with reference to the diagrammatic illustration shown in FIG. 3. Rectangles 47, 48, 49, 50, 51 and 52 in the drawing represent an exemplary relay of the type described in connection with the relays REL shown in FIG. 2. Each of the relays is shown released, that is, with its winding deenergized which places each armature spring thereof in contact with its associated back-contact spring. As shown, relay 47 is of the double winding type so that as seen herein it comprises two windings 47*a* and 47*b*. A source of d.c. voltage 45 and a ground lead 46, both of which may be supplied by the customer at the PABX trunk, are shown, respectively, as present at conductors 11 and 13. It will be understood that conductors 11 and 13 are electrically connected to those portions of the circuit of FIG. 3 shown as having corresponding symbols.

With these considerations established, it will be assumed that a subscriber at PABX extension 14 wishes to make a call utilizing loop-start operation. When the handset is lifted, a loop is closed over a path extending between tip conductor 53 and ring conductor 54 in a well-known manner. With the normally open switchhook now closed, a path is completed which causes relay 47 to become energized. The energizing circuit for relay 47 extends from source conductor 11, winding 47*b* of relay 47, line 44, contact *a-b* of relay 50, line 56, contact *a-b* of relay 51, line 57, ring conductor 54, over the loop to tip conductor 53, line 58, contact *d-e* of relay 51, line 59, contact *d-e* of relay 50, line 60, through winding 47*a* of relay 47, line 61, contact point 62, strap 63, contact point 64, and thence to ground conductor 13. As described, the strap 63 connected between contact points 62 and 64 represents a circuit connection between two of the points CP on panel 34 necessary to achieve loop-start operation. Its energizing circuit complete, relay 47 operates and, in operating, it prepares a ground connection on conductor 65 as a service request applied through the interface. The ground connection to conductor 65 is closed over a path extending from ground conductor 13, line 66, contact *a-b* of relay 48, line 68, contact *a-b* of relay 49, line 70, contact *a-c* of relay 47, and line 71 to conductor 65. The appearance of ground on conductor 65 seizes the service request circuit at central office 12.

On the exchange being seized and being prepared for receipt of dialing pulses, a ground path is completed via interface circuit 30 to conductor 72 which operates relay 48. The circuit for energizing relay 48 extends from source conductor 11, resistor 73, relay 48, to line 74 and conductor 72. With relays 47 and 48 energized, relay 49 becomes energized over a path extending from conductor 13, resistor 75, relay 49, lines 76, 77 and 78, contact *e-f* of relay 48, lines 79 and 80, contact *d-f* of relay 47, to line 81 and conductor 11. Dial tones will be passed from central office 12 by conductors 82 and 84 and via conductors 53 and 54 to the PABX trunk. The circuit is now ready for dial pulsing at extension 14.

Relay 49, upon operating, locks itself energized over a path extending from conductor 13, resistor 75, relay 49, lines 76 and 77, contact *d-e* of relay 49, lines 85 and 80, contact *d-f* of relay 47, to line 81 and conductor 11. Once operated, relay 49 thus becomes independent of relay 48 by virtue of the shunt contact *d-e* of relay 49 bypassing contact *e-f* of relay 48. Relay 49 thus becomes locked only to relay 47 and, moreover, when operated, relay 49 is of the slow-release type over its contact *g-h* due to the charge stored on capacitor 86 in series with resistor 87 to conductor 13. Being slow to release, relay 49 remains operated during cyclic opening and closing of the normally closed dial contacts in the loop between conductors 53 and 54 as operation of the dial cyclically operates relay 47.

The recurring operation of relay 47 during dialing results in pulses on conductor 65 to the interface circuit over a path extending from conductor 13, line 66, contact *a-c* of relay 48, line 88, contact *a-c* of relay 49, line 70, contact *a-c* of relay 47 to line 71 and conductor 65. The user of the telephone set alerted to the call by the ringing signals responds by going off-hook which closes its switchhook. The calling user at PABX extension 14 and the called party are now connected for talking over a route internally of interconnection device 32 which includes the following paths: conductor 53, line 58, contact *d-e* of relay 51, line 59, contact *d-e* of relay 50, lines 60 and 89 and conductor 82; and conductor 54, line 57, contact *a-b* of relay 51, line 56, contact *a-b* of relay 50, and lines 44 and 90 to conductor 84.

Assuming that the user of the telephone at extension 14 wishes to terminate the call and is the first to disconnect, opening of the switchhook will interrupt the path over which relay 47 is held operated and relay 47 therefore releases. Release of relay 47, in turn, opens at its contact *d-f* the operating contact for relay 49 which thereupon releases. Removal of the seizure from conductor 65 as contact *a-c* of relay 47 opens will cause central office 12 to disconnect. Central office disconnect will be detected by interface circuit 30 which will cause ground to be removed from conductor 72 thereby causing relay 48 to release. Relays 47, 48, and 49 are all now restored to normal.

If now it is assumed that the subscriber into the central office is the first to disconnect, relay 48 will be released by interruption of its energizing circuit occasioned by the removal of a ground from conductor 72 as described. Disconnect at extension 14 will cause relay 47 to release. Relay 49 follows relay 47 and also releases. Relays 47, 48 and 49 are now deenergized and the circuit is restored to normal.

The arrangement in FIG. 3 may include the provision of conductors 91, 92 and 93 at the PABX trunk outlet of interconnection device 32 for monitoring, in the form of a ground pulse, the conditions of central office disconnect and PABX disconnect. This separate set of contacts as controlled by relays 48 and 49 is provided for use by a customer when central office supervision is required in the PABX trunk for disconnect. To effect the monitoring, a strap 94 is connected between contact points 95 and 96 whose physical location, it is understood, is on panel 34. A ground lead from the PABX trunk is connected to conductor 93. This ground is applied to conductor 92 over contact *g-i* of relay 48 and line 100 following central office disconnect. The same ground lead is applied to conductor 91 over line 97, contact *g-h* of relay 48 and line 99 during a central office busy condition. Ground will be removed from conductor 92 following PABX disconnect but prior to central office disconnect, and from conductor 91 following central office disconnect as relay 48 releases.

Another feature of the interconnection device of the invention takes into account the sometimes employed central office provision of answer supervision by which the central office reverses polarity on the tip and ring conductors (reversal of the central office line). When answer supervision is employed, it is essential to effect a reversal of the tip and ring conductors leading to the PABX trunk on indication from the interface circuit that the central office pair has been reversed. For alerting the PABX trunk to such a reversal, the interconnection device embodying the invention is provided with the relay 50. When answer supervision is detected by the interface circuit 20, a ground lead will be connected to conductor 102. Relay 50 then operates over a path extending from conductor 102, line 104, relay 50, to resistor 105 and conductor 11. In operating, relay 50 completes a circuit which reverses the polarity originally established on conductors 53 and 54 connected to the PABX trunk. The polarity reversal indication circuit is closed over a path extending from conductor 82, lines 89 and 60, contact *d-f* of relay 50, lines 105 and 56, contact *a-b* of relay 51, line 57, conductor 54, the closed subscriber's loop at PABX extension 14, conductor 53, line 58, contact *d-e* of relay 51, line 59, contact *a-c* of relay 50, to lines 44 and 90 and conductor 84. Thus, it can be seen that operation of relay 50, upon demand by the central office, produces the necessary polarity reversal at conductors 53 and 54 coupled to the PABX trunk.

The description thus far has been concerned with a loop-start basis made possible by connecting strap 63 between contact points 62 and 64. As opposed to a loop start, the provision for ground-start operation will now be described, it being assumed that strap 63 is removed during ground start. As shown herein, contact points 62 and 106, when connected by a strap 107, serve to provide a ground start by coupling the relay 47 to a ground circuit. This circuit extends, in part, from line 61, strap 107, line 108, contact *j-k* of relay 48, and line 109 to conductor 13. Contact *j-k* of relay 48 being included in this circuit, it will be apparent that a ground connection applied to conductor 72 by interface circuit 30 is a requirement for ground-start operation as herein described.

As an optional requirement in some systems, toll restrictions will require a pulsing output to the PABX trunk. This will prevent restricted subscribers therein from making toll calls without recording supervision. To fulfill this requirement in the interconnection device embodying the invention, a strap 110 is connected between contact points 111 and 112 coupled to a conductor 114. As relay 47 follows the dialing pulses transmitted by the user at extension 14, conductor 114 cyclically presents a ground pulse to the PABX trunk over a path extending from conductor 13, line 115, contact *g-h* of relay 47, line 116, to strap 110. By pulse counting, the *g-h* contact of relay 47 notifies the PABX of each unsupervised or unauthorized toll call which utilizes a number of dial pulses in excess of a predetermined number of dialed digits.

INCOMING CALL TO PABX

Referring to FIG. 3, it will be assumed that the station 10 is connected through central office 12. The off-hook indication will be detected by interface circuit 30 and displayed as a ground connection which is applied to conductor 72. As described above, relay 48 becomes energized. Ringing current from the central office is now applied through the interface such as to present a ground pulse at a conductor 118 at each ringing interval. Relay 51 will operate during each ringing interval over a path extending from conductor 118, lines 119 and 120, contact *a-b* of relay 52, line 121, relay 51, line 122, resistor 123, line 124, contact *d-e* of relay 47, to line 81 and conductor 11. With relay 51 energized, ringing A.C. to conductor 53 is applied from a conductor 125 over line 126, contact *d-f* of relay 51, and line 58. The path for the ringing return is through conductor 11, capacitor 128, lines 130, 131 and 132, contact *a-c* of relay 51, line 57, and the loop between conductors 54 and 53.

Assuming that the called party at extension 14 responds by going off-hook, a loop closure is established between conductors 53 and 54 as described above. If the call in the PABX trunk is answered during the interval of no ringing current (silent interval) relay 47 will be the first to operate over a path, as above described, which includes the contacts *a-b* and *d-e* of relay 51 in their released positions. Relay 49 will thereupon become energized thus following the operation of contact *e-f* of relay 48 and contact *d-f* of relay 47. Relays 47, 48 and 49, all operated, convey an answer indication to the central office via a path, described above, by which conductor 13 is seen by conductor 65 over contact *a-c* of relay 48, line 88, contact *a-c* of relay 49, line 70, contact *a-c* of relay 47, and line 71. Under these conditions, the interconnection device 32 is in a state which provides a talking connection between the calling subscriber and the PABX extension 14.

In the event the call directed to the PABX is answered when the ringing current is applied (ringing interval), relay 47 does not operate since obviously it depends upon the normally released contacts *a-b* and *d-e* of relay 51 for its path of energizing current. Instead, an answer during the ringing interval completes a path for operating relay 52. The energizing circuit for relay 52 extends from conductor 125, line 126, contact *d-f* of relay 51, line 58, the closed loop between conductors 53 and 54, line 57, contact *a-c* of relay 51, lines 132 and 131, diode 134, and relay 52 to conductor 11. Relay 52, operated, opens at its contact *a-b* the energizing path for relay 51, whereupon relay 51 releases, and simultaneously, relay 52 completes at its contact *e-d* a holding circuit by which it becomes locked to the conductor 118 via line 119 until the ringing signal originating at central office 12 ceases. The release of relay 51 restores the closure of its contacts *a-b* and *d-e* which, as a consequence thereof, completes the above-described circuit over which relay 47 operates. Operation of relay 47 allows the operation of relay 49 over the path including contact *d-f* of relay 47, and contact *e-f* of relay 48, the latter relay having remained operated. As before, the concurrent operation of relays 47, 48 and 49 places interconnection device 32 in a talking mode, this state being announced to the central office by the above ground circuit completed by device 34 to conductor 65. Upon cessation of the ringing signal at conductor 118, once steady ground appears on conductor 65, relay 52 responds to the removal of ground from conductor 118 and releases. At this time, relays 51 and 52 are restored to their normal released conditions.

The operation of the interconnection device 32 when the conversation ends is the same as the above-described disconnect procedure for calls originating at the PABX. Briefly, therefore, should extension 14 be the first to go on-hook, relay 47 releases and, in turn, it is followed by the release of relay 49. Central office 12 responds to the removal of the seizure at conductor 65 and removes the ground from conductor 72, whereupon relay 48 also becomes deenergized. The circuit is now returned to normal. Should, on the other hand, the central office be the first to go on-hook, relay 48 releases due to the removal of ground from conductor 72. When now the PABX station goes on-hook, relay 47 will release. Owing to the opening contact *d-f* of relay 47, relay 49 also is released due to the interruption of its energizing current. The circuit is thus returned to normal and is poised for either the next incoming or outgoing call.

GENERAL DESCRIPTION OF FIG. 4

FIG. 4 shows a variation of the interconnection device 32 which may be employed where the PABX does not require the provision of central office reversal. Referring further to FIG. 4, it may be seen that the diagram shows a portion of the diagram in FIG. 3, that portion utilizing only five of the six relays. Thus, of the relays 47 to 52 inclusive, only the relays 47, 48, 49, 51 and 52 are shown, the relay 50 and its associated contact structure having been omitted. This omission deletes from the interconnection device the function available in the FIG. 3 diagram for reversing the polarity to the PABX trunk upon receipt of a reversal indication from the interface circuit. For simplification and clarity, no detailed description of the diagram of FIG. 4 will be given, it being apparent upon inspection of the diagram that the modification shown preserves all those functions available from the operation described in connection with FIG. 3, except for the feature of answer supervision.

GENERAL DESCRIPTION OF FIG. 5

Figure 5:
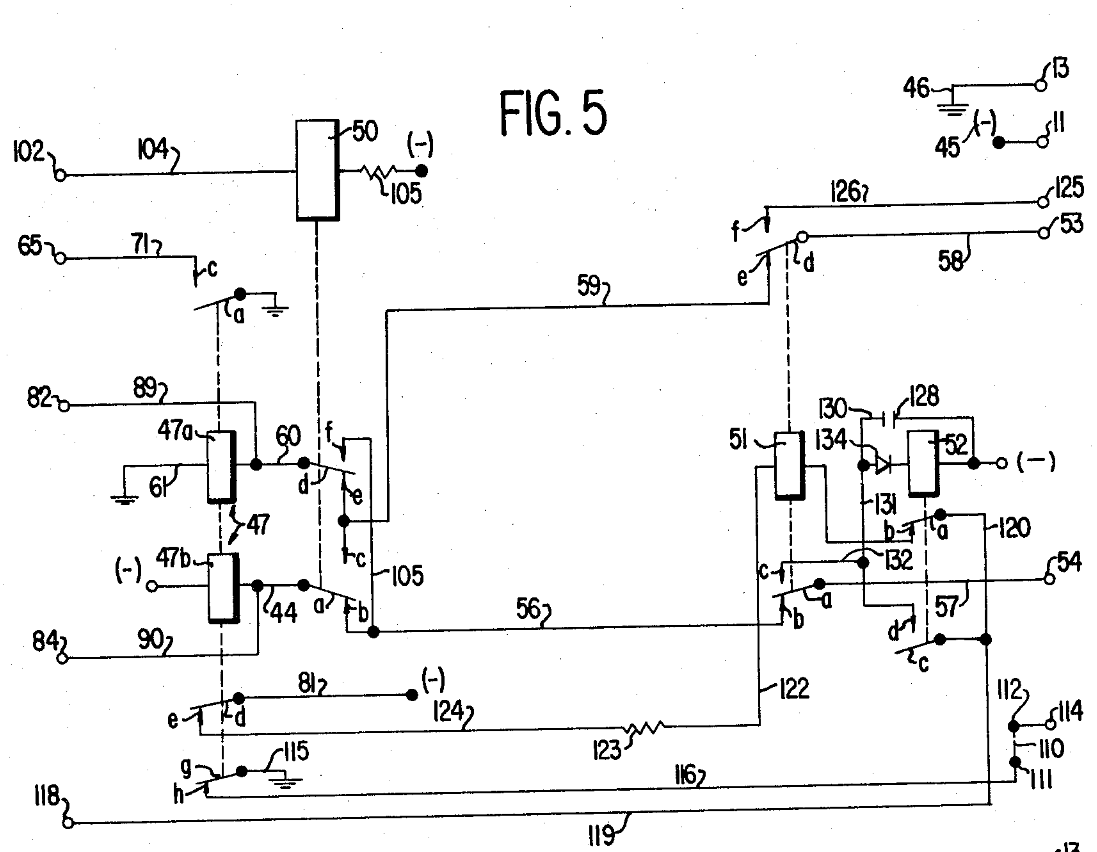

FIG. 5 shows another and more simplified variation of the interconnection device 32 wherein it may be seen that a smaller portion of the diagram of FIG. 3 is shown which utilizes only four of the six relays. Thus, of the relays 47 to 52 inclusive, only the relays 47, 50, and 51 and 52 are shown, the relays 48 and 49 with their associated contact structures having been omitted. The absence of relay 48 and its associated contact structure deletes the provision of central office supervision in those cases where this provision is found to be of minor importance. It is further apparent that the absence in FIG. 5 of relays 48 and 49 removes by choice of the PABX customer the condition of monitoring central office disconnect.

OUTGOING CALL FROM PABX

Referring to FIG. 5, operation will be restricted to a loop-start since by the removal of relay 48 and its associated contact *j-k* line 61 coupled to winding 47*a* of relay 47 is connected directly to ground. With the handset raised at PABX extension 14, a loop is closed which causes relay 47 to become energized over a path extending from conductor 11, winding 47*b* of relay 47, line 44, contact *a-b* of relay 50, line 56, contact *a-b* of relay 51, line 57, ring conductor 54, over the subscriber's loop to tip conductor 53, line 58, contact *d-e* of relay 51, line 59, contact *d-e* of relay 50, line 60, winding 47*a* of relay 47, and line 61 to conductor 13. In operating, relay 47 closes its contact *a-c* thus applying a ground pulse to conductor 65 over line 71. Dial tone from central office 12 is now passed by conductors 82 and 84 and via conductors 53 and 54 to the PABX trunk. The circuit at extension 14 is prepared for dial pulsing which is followed by contact *a-c* of relay 47. Upon answer by the called party, the called and calling parties are now connected for conversation. Assuming that the caller at PABX extension 14 goes on-hook first, relay 47 releases due to opening of the loop between conductors 53 and 54. The ground circuit established to conductor 65 opens at contact *a-c* of relay 47 which brings the call to a conclusion and restores all conditions to normal. Termination of the conversation by the called party connected to the central office lines will be detected by the calling party at PABX extension 14 who then may go on-hook.

The feature of the interconnection device embodying the invention of providing answer supervision is preserved intact in the FIG. 5 arrangement due to the continued presence of relay 50 so that, should a ground lead be connected to conductor 102, relay 50 will become energized over its previously-traced energizing path to complete a circuit by which the polarity sensed at conductors 53 and 54 is reversed due to the changeover of the contacts associated with relay 50 to their positions in which the upper contacts *a-c* and *d-f* become established. In addition, the toll supervisory feature provided over contact *g-h* of relay 47 remains available to the PABX in the FIG. 5 arrangement as the number of dialing pulses is provided to conductor 114 via line 116 and strap 110.

INCOMING CALL TO PABX

Referring still to FIG. 5, it will be assumed as was previously that station 10 becomes connected to central office 12. The off-hook condition results in ringing current being applied to conductor 118. Relay 51 will operate during each ringing cycle over the above-traced path by which relay 51 becomes energized. Relay 51 operated, ringing A.C. to conductor 53 is applied from conductor 125 over line 126, contact *d-f* of relay 51 and line 58. The return path for ringing current is the same as that previously described in detail. If the party being called at extension 14 responds by going off-hook, a loop closure is established between conductors 52 and 54. Voice communication is now established. If the call is answered at the PABX station during the silent interval, relay 47 will operate because of the loop closure extending to contacts *a-b* and *d-e* of relay 51. Since the operation of relay 47 will close its contact *a-c*, an answer indication reaches conductor 65 represented by the acquisition of ground over contact *a-c* of relay 47. With these conditions established, interconnection device 32 now provides voice transmission over a two-wire circuit which includes conductors 53, 54, 82 and 84.

Should it be that the loop at the PABX indicative of an off-hook condition occurs at a time during the ringing interval, a path hereinabove described for operating relay 52 is completed. As hereinabove described, relay 52, operated, causes relay 51 to release, and also locks itself to conductor 118 via line 119 and its contact *c-d* until ringing ceases. As relay 51 releases, the energizing circuit for relay 47 becomes completed, whereupon a ground pulse to conductor 65 announces to the central office that interconnect device 32 is in a talking mode. With steady ground appearing at conductor 65, ringing current to conductor 118 ceases thus causing the release of relay 52 as contact *c-d* opens. Relays 51 and 52 are thus restored to their normal released positions. The subsequent disconnect at PABX extension 14 releases relay 47, as previously described. In the event that disconnect occurs first by the calling party, this indication is passed on to the called party who, by going on hook, will restore relay 47 to the initial deenergized condition.

GENERAL DESCRIPTION OF FIG. 6

Figure 6:
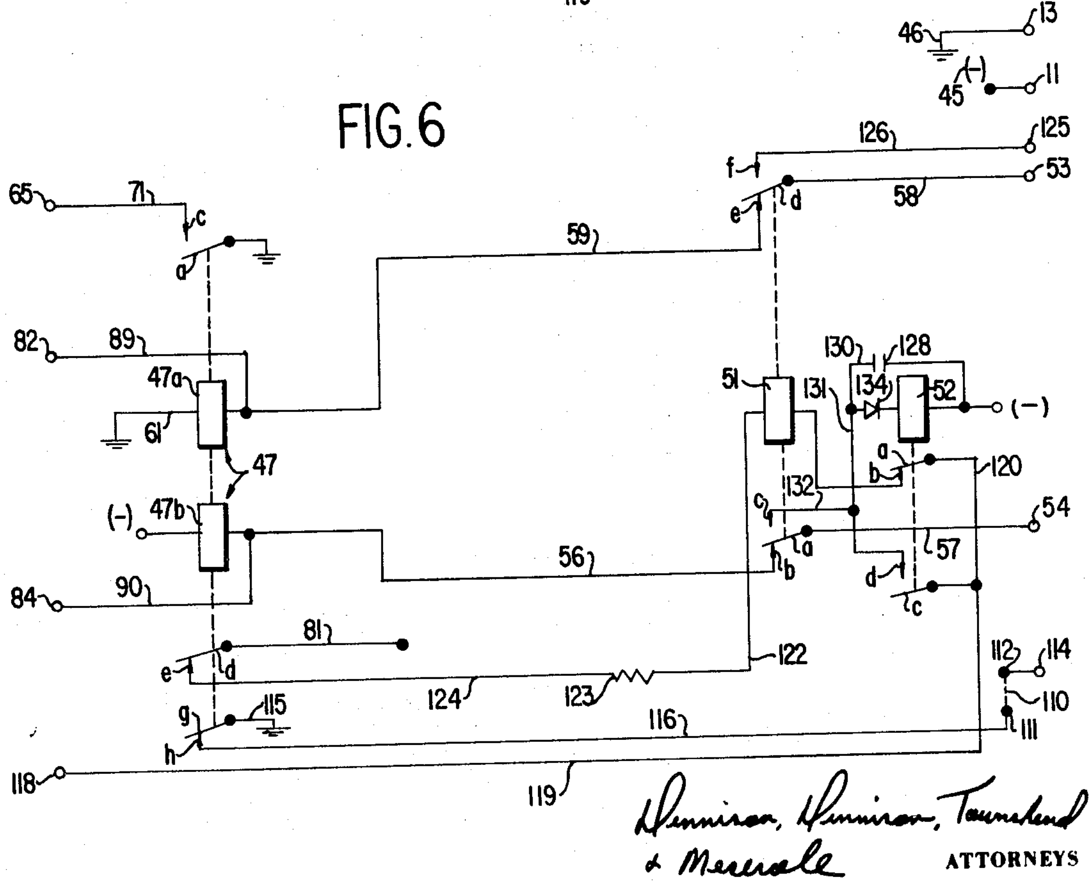

FIG. 6 shows a variation of the interconnection device 32 in which it is noted that it shows a portion of the diagram of FIG. 5 including only the relays 47, 51, and 52, the relay 50 and its associated contact structure having been omitted. The FIG. 6 circuit is arranged to perform in the detail previously described for the operation of FIG. 5, except that it will be understood that with the removal from panel 34 of relay 50 and its associated contacts, the service of answer supervision previously noted is no longer available.

GENERAL DESCRIPTION OF FIG. 7

Figure 7:
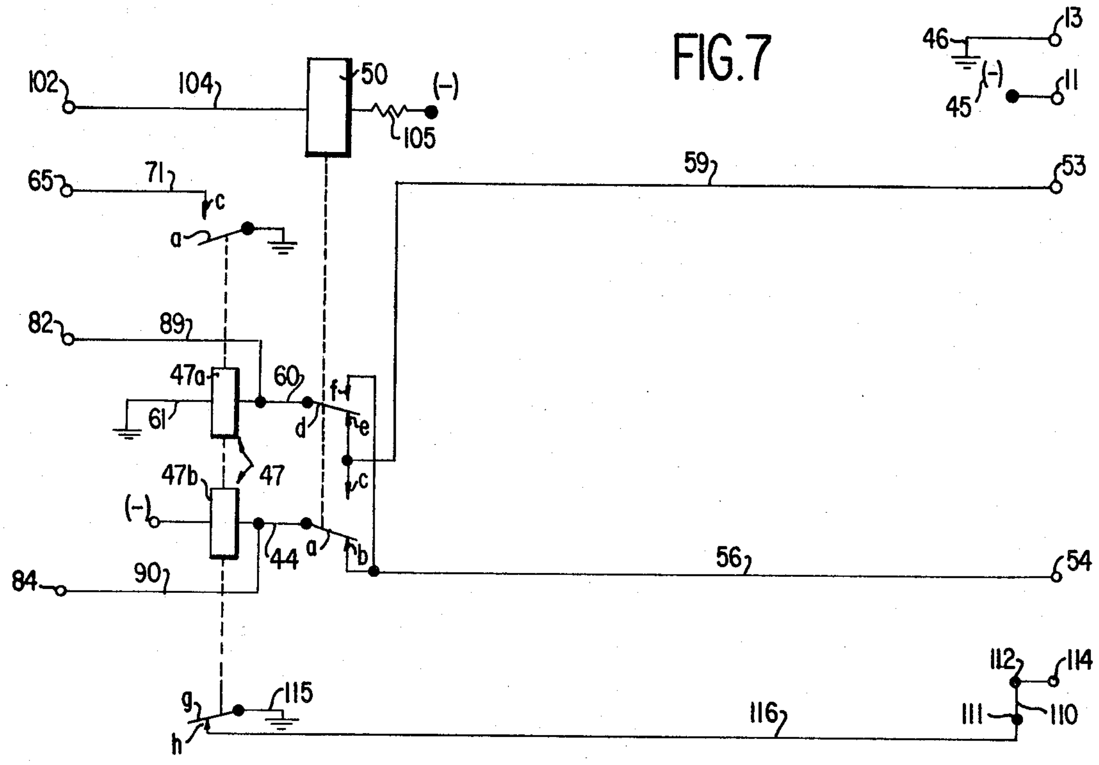

In FIG. 7, another variation of interconnection device 32 is shown in which a subscriber at PABX station 14 is able to communicate with station 10 serviced by the central office only by a call initiated by a user at station 14. Thus, only outgoing calls from the PABX are permitted by the FIG. 7 arrangement. It can be seen, therefore, assuming that the loop is closed between conductors 53 and 54, that relay 47 becomes energized and the contact *a-c* thereof proceeds to connect a ground lead to conductor 65 to effect a seizure of an available calling line by which the called party may be reached. Once seized, a dial tone will be transmitted by way of conductors 82 and 84, as previously described, to conductors 53 and 54. With this connection complete, dial pulsing at extension 14 produces recurring pulses at conductor 65. In response to the called party going off-hook, the two parties are now ready for conversation. When either the called party of the PABX station goes off-hook, to thus initiate the release of relay 47, the circuit is restored to normal. It will be apparent that the feature of answer supervision is provided in FIG. 7 in conformance with the operation hereinabove described concerning relay 50, which is included in the FIG. 7 arrangement. In similar fashion, as described previously, supervision of toll calls is effected in FIG. 7 by the contact *g-h* in following the operation of relay 47 as the calling subscriber proceeds to send the digits designating the called station.

GENERAL DESCRIPTION OF FIG. 8

Figure 8:
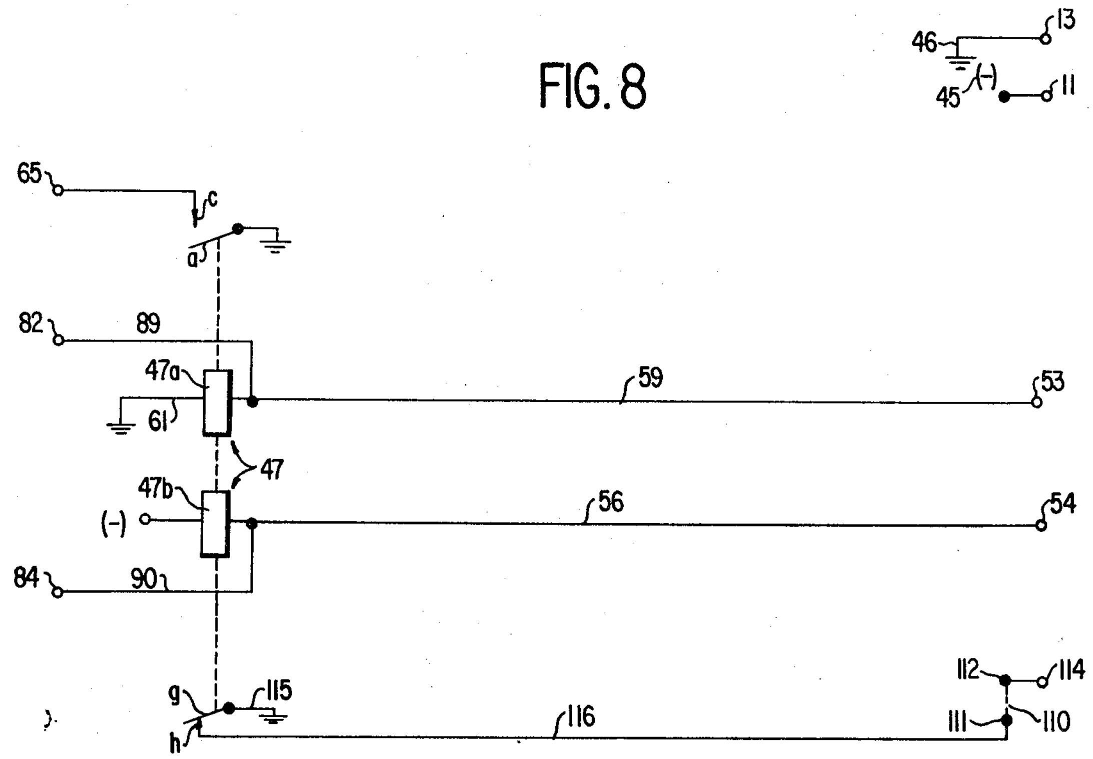

FIG. 8 describes a variation of the interconnection device 32 which represents the simplest and most economic interconnection requirements selected by a PABX. Accordingly, it may be seen that the FIG. 8 circuit lends itself to satisfying a limited number of customers requirements which include the following: communication initiated solely by the PABX going off-hook, and supervisory action over restricted toll calls initiated at the PABX. The operation attendant to these features having been given previously, no further detailed description for an understanding of the operation of the FIG. 8 embodiment is believed necessary. One-way communication initiated by the PABX will, as before, result in seizure of a circuit through interface 30, with contact *g-h* of relay 47 responding to the registration of dial impulses as relay 47 is recurringly operated.

From the operation which has been explained in the description of the interconnection device, it becomes apparent that the circuit configurations described have many advantages helpful to users of privately owned equipment on telephone company lines. It eliminates the need for re-design and reengineering required when using existing stocks of trunk equipment; avoids having to modify existing exchanges at time of installation; avoids having to modify existing PABX trunk circuits before shipment to an installation site; removes the need to modify circuits back to the original configuration when interface operation is not required or if equipment is to continue in use without an interface; eliminates added costs for both parts and labor in excess of the cost of the interconnection device and its installation; reduces the cost associated with training personnel to modify many different types of equipment; and reduces to a minimum the expense required for installation with an interface circuit.

It will be understood that the invention is not limited to the embodiments described above, it being apparent to those skilled in the art that various changes and modifications may be made without departing from the spirit of the invention or the scope of the appended claims.

What is claimed is:

1. An interconnection device for voice coupling an interface, having connections to a central office, and a branch exchange, said device comprising:

a circuit board;

a plurality of first conductors carried by said board for passing a current in response to the closure of a loop circuit at said exchange;

a plurality of second conductors carried by said board for passing a current in response to the closure of a loop circuit at said interface;

first relay means carried by said board responsive to a loop-closure signal passed by said first conductors for connecting the calling line at said exchange through said interface to said central office, other relay means carried by said board responsive to a loop-closure signal passed by said second conductors for connecting a calling line at said interface to a line at said exchange;

and means including an associated contact structure operated by said first relay means for applying to a predetermined pair of said second conductors dial signal impulses in accordance with the dial signals during an outgoing call from said exchange.

2. An interconnection device in accordance with claim 1 further including means associated with said first relay means for regulating calls originating at said exchange thereby to prevent the occurrence of unrestricted toll calls.

3. An interconnection device in accordance with claim 1 further including central office supervision means for reversing the polarity of the loop-closure conductor ones of said plurality of first conductors upon demand of a central office reversal signal transmitted to said interface.

4. An interconnection device in accordance with claim 1 wherein said circuit board includes at least one set of contact points accessible readily for bridge-type electrical connection according to predetermined levels of line switching service required by said exchange.

5. An interconnection device in accordance with claim 1 wherein said other relay means includes first and second relays operable to establish a voice circuit between said interface and said exchange independent of whether an off-hook condition arises in said exchange during the ringing interval or silent interval of the ringing cycle as an inbound call to said exchange occurs.

6. An interconnection device in accordance with claim 1 further including means for applying to a predetermined ones of said first conductors a signal when central office supervision is required in said exchange for disconnect.

7. In a telephone system, in a private automatic branch exchange, an interface including lines extending to a central office, said central office including means for transmitting bursts of ringing signals, and an interconnection device for interconnecting said exchange and said interface, said interconnection device comprising:

first relay means responsive to a closed loop originating at said exchange for repeating to said interface a series of successive dialed digit signals for extending a connection of said closed loop to a closed loop completed through said interface once the central office responds with a dial tone;

second relay means responsive to seizure of said central office for registering by closure of associated contacts thereof central office supervision;

third relay means energized over operated contacts of said first and second relay means for enabling when energized the transmission to said exchange of a timing signal on disconnect over a path including a contact operated by said second relay means;

fourth relay means having normally released contacts included in the energizing circuit of said first relay means and responsive to receipt of a central office energizing signal applied thereto for reversing, by operation of said contacts thereof from released to operated positions, the polarity sensed by the loop circuit associated with said exchange;

fifth relay means responsive to an energizing signal received from said interface for becoming operated for the duration of the ringing cycle;

and sixth relay means normally released and operated over a circuit including an operated contact of said fifth relay means upon closure of the loop at said exchange during the ringing cycle when an incoming call is answered.

8. An interconnection device in accordance with claim 7 wherein said first through sixth-recited relay means and the contact structure individually associated therewith are mounted in supportive relation on a printed circuit board having a plurality of conductors electrically coupled to said contact structure for mounting connection with a line cell to which both said interface and said exchange have terminal connections.

* * * * *